(12) United States Patent
Doshi et al.

(10) Patent No.: US 11,727,687 B2
(45) Date of Patent: *Aug. 15, 2023

(54) PROCESSING CONTENT BASED ON NATURAL LANGUAGE QUERIES

(71) Applicant: Comcast Cable Communications, LLC, Philadelphia, PA (US)

(72) Inventors: Nishant Doshi, Norristown, PA (US); Daniel Grady, Audubon, NJ (US); Glenn Wesley, Macungie, PA (US); John Schmerge, Newton, PA (US); Scott Laubach, Harleysville, PA (US); Yan Sperling, Holland, PA (US); Arvind Mundra, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,296

(22) Filed: Mar. 22, 2022

(65) Prior Publication Data

US 2022/0392221 A1 Dec. 8, 2022

Related U.S. Application Data

(63) Continuation of application No. 17/127,391, filed on Dec. 18, 2020, now Pat. No. 11,321,569, which is a continuation of application No. 15/806,057, filed on Nov. 7, 2017, now Pat. No. 10,909,378.

(51) Int. Cl.
*G06V 20/40* (2022.01)
*G06F 3/16* (2006.01)
*H04N 21/431* (2011.01)
*G06F 16/242* (2019.01)
*G06F 16/783* (2019.01)
*G06F 16/78* (2019.01)

(52) U.S. Cl.
CPC .............. *G06V 20/41* (2022.01); *G06F 3/167* (2013.01); *G06F 16/243* (2019.01); *G06F 16/784* (2019.01); *G06F 16/7837* (2019.01); *G06F 16/7844* (2019.01); *G06F 16/7867* (2019.01); *H04N 21/431* (2013.01)

(58) Field of Classification Search
None
See application file for complete search history.

(56) References Cited

U.S. PATENT DOCUMENTS

2011/0208722 A1* 8/2011 Hannuksela .......... G06F 16/487
707/723

* cited by examiner

*Primary Examiner* — James R Marandi
(74) *Attorney, Agent, or Firm* — Ballard Spahr LLP

(57) ABSTRACT

Disclosed are systems and methods for summarizing content or preparing missed portions of content based on natural language queries. A natural language query can be received. One or more portions of summarized or missed content can be determined based on the natural language query, and transmitted to a user device.

25 Claims, 6 Drawing Sheets

200

```
<content id="hamlet">
.....      ┌201    ┌202    ┌203     ┌204           ┌206
    <portion id="5" start="23:35" end="27:18" significance="4">
        <characterlist>
            <character="Ghost"/>
208 ┐       <character="Hamlet/>
        </characterlist>              ┌210
        <description> The ghost of Old Hamlet reveals to his son that he was
murdered by Claudius and demands that young Hamlet seeks revenge. Hamlet
decides to feign madness in an attempt to find proof of his uncle's guilt</
description>
    </portion>
.....
    <portion id="9" start="1:42:18" end="1:55:01" significance="5">
        <characterlist>
            <character="Claudius"/>
            <character="Polonius/>
            <character="Ghost"/>
            <character="Hamlet/>
        </characterlist>
        <description> Claudius and Polonius eavesdrop when Hamlet meets Ophelia.
Hamlet speaks the famous soliloquy ('To be or not to be') and rejects Ophelia,
whom he had previously professed love to, believing that she is in league with his
uncle and Polonius</description>
    </portion>
.....
</content>
```

FIG. 2

PROCESSING CONTENT BASED ON NATURAL LANGUAGE QUERIES

CROSS REFERENCE TO RELATED APPLICATIONS

This application is a continuation of U.S. patent application Ser. No. 17/127,391 filed Dec. 18, 2020, which is a continuation of U.S. patent application Ser. No. 15/806,057 filed Nov. 7, 2017, which are herein incorporated by reference in their entirety.

BACKGROUND

Users may become distracted or otherwise have their attention directed away from content they are experiencing (e.g., watching a movie). This can result in the user missing an important event or plot point. In order to catch up on the plot of the content, a user may have to rewind to their last remembered point in the content. This may require the user to replay more missed content than needed. These and other shortcomings are addressed by the approaches set forth herein.

SUMMARY

It is to be understood that both the following general description and the following detailed description are exemplary and explanatory only and are not restrictive. In one aspect, provided are methods and systems for summarizing content using user queries. A natural language query can be received and a summary for content can be generated based on the natural language query. When the natural language query is received, content being transmitted to a user device can be determined. The summary for the content can then be generated from a first portion of content defined by a time period. The summary can comprise a plurality of second portions of the content included in the first portion of the content, e.g. "clips" taken from the first portion of the content. For example, a summary for the content can be generated from a defined period in the content, e.g., the last ten minutes. The summary can comprise clips of the content taken from the last ten minutes of the content.

In another aspect, a natural language query can be received. One or more portions of content relevant to an event associated with the natural language query can be determined. These one or more portions can be used to generate a summary of the content for the event. Playback of the content to a user device can be caused to cease, and the summary can be transmitted to the user device. Playback of the content to the user device can be resumed once playback of the summary has completed.

In yet another aspect, a natural language query can be received. One or more keywords can be determined from the natural language query. A summary of content can be generated based on the one or more keywords and metadata associated with the content. Playback of the content to a user device can be caused to cease, and the summary or complete version of the missed content can be transmitted to the user device. Playback of the content to the user device can be resumed on completion of playback of the summary.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is an example of content metadata;

DETAILED DESCRIPTION

Figure 1:
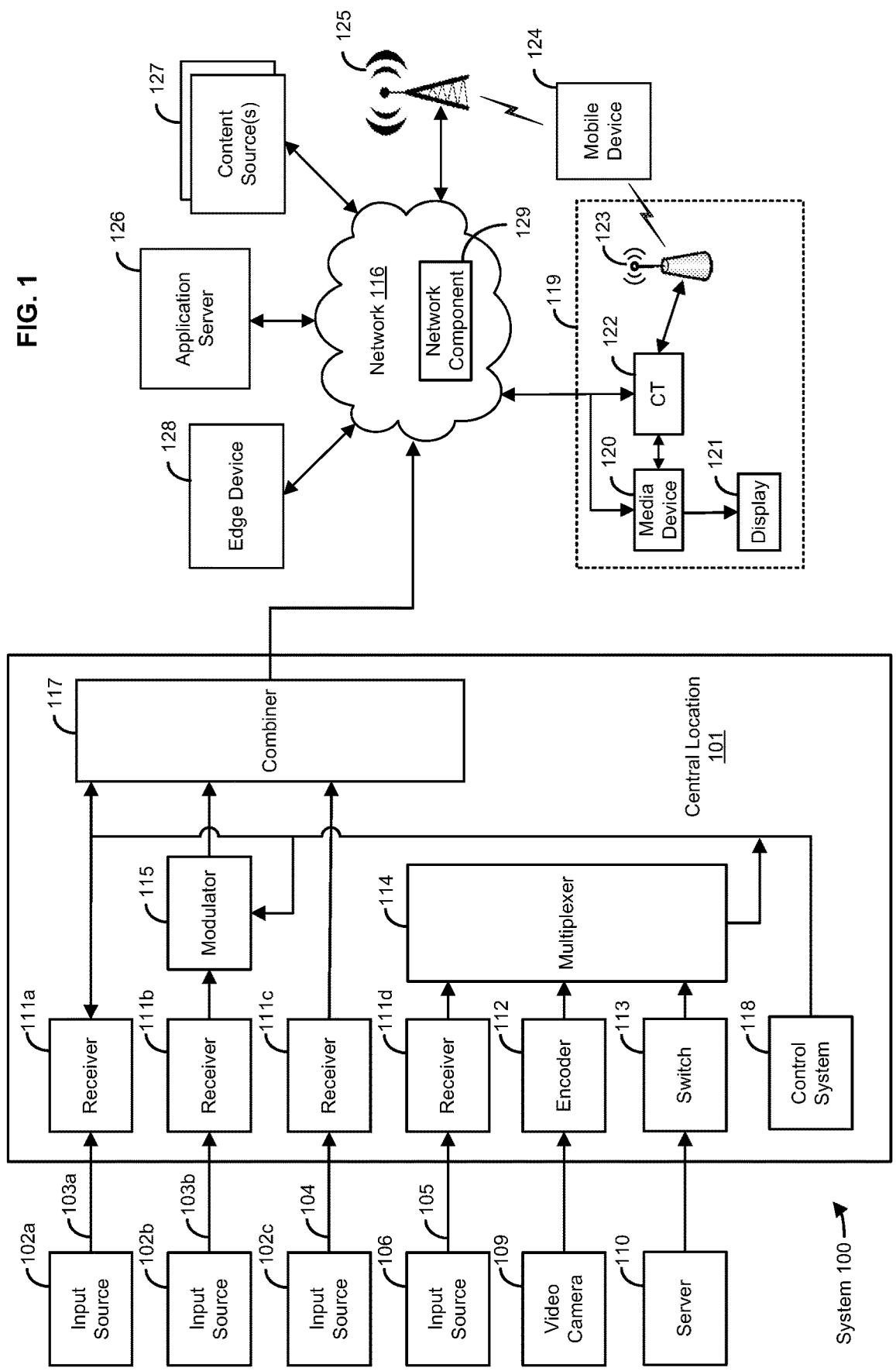
FIG. 1 is a diagram of an example content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to generating summaries of content according to user queries. Users may become distracted or otherwise have their attention directed away from content they are experiencing. For example, a user viewing video content may become distracted by a secondary screen or device, such as a mobile phone or tablet. Such distractions can result in the user missing an important event or plot point. In order to catch up on the plot of the content, a user can rewind to the last remembered point in the content. This approach has several drawbacks. First, a user must closely monitor the progress of the rewind to make sure they do not rewind farther than desired. Second, this requires the user to experience the entirety of the missed content.

To address these drawbacks, the disclosed is a system whereby a user can provide a natural language query to a component of a content delivery network, e.g., a computing device. The natural language query can comprise a voice command provided by the user and indicating a desired portion of content to be summarized. For example, the natural language query can indicate a desire for a summary of the content over a time period, e.g., "What happened over the last ten minutes?" or "What just happened?" The natural language query can also indicate a desire for a summary related to a character or event, e.g., "Who is that?" or "How did Polonius die?"

The content delivery network can leverage the knowledge of what content is being transmitted to a user device, as well as accessible metadata, to generate the summary of the content. The summary of content can be used to present, to the user, portions of content relevant to the query. For example, the summary can include portions of content relevant over a time period, e.g., two minutes, five minutes, ten minutes, etc. . . . . The summary can also include portions of content relevant to an event, character, or keywords included in the natural language query. The portions of content can be aggregated, as the summary of content, into video content. The summary can include a time point of potential replay, the selection of which will resume content playback at this time point. The summary of content can then be transmitted to a user device. For example, playback of the content of the user device can be paused, allowing for playback of the summary of content to be presented to the user on the user device.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

The central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

A component of the system, e.g., the edge device 128, can receive a natural language query. The natural language query can correspond to a user associated with a user device to which content is being transmitted. For example, the natural language query can comprise a voice query provided to a set top box or other user device to which content is being transmitted. As another example, the natural language query can comprise a voice query provided to a control device, e.g., a remote control, of the set top box. As a further example, the natural language query can comprise a voice query provided to a computing device configured to listen for ambient trigger keywords in order to initiate reception of the voice query. In yet another example, the natural language query can comprise a text query transmitted by a user device, e.g., a mobile device.

In response to receiving the natural language query, the edge device 128 can determine whether to generate a summary of content. Determining whether to generate the summary of content can comprise performing a contextual analysis on the natural language query to determine if the natural language query comprises a question. Determining if the natural language query comprises a question can include determining if the natural language query comprises a keyword such as "who," "what," "when," "where," "why," or "how." Determining if the natural language query comprises a question can also include determining if the natural language query matches one or more predefined queries, e.g., "What happened in the last X minutes?," where X is a number of minutes, or "Who is that?" Thus, the edge device 128 can differentiate between natural language queries to perform playback functions or trick plays, e.g., rewind, pause, or fast-forward, and natural language queries which should be responded to with a summary of content.

The edge device 128 can then determine what content is being transmitted to the user device. Determining what content is being transmitted to the user device can include accessing request logs, transmissions, or other data associated with the user device that can identify the content. Determining what content is being transmitted to the user device can also include transmitting a request to the user device to identify the content.

Next, the edge device 128 can determine one or more portions of the content to be transmitted to the user device in response to the query as a summary of the content. Determining the one or more portions of the content can include determining that the natural language query can be satisfied by a summary of the content over a predefined time period. For example, the edge device 128 can determine that the natural language query indicates the time period, e.g. "What happened in the last ten minutes," with the last ten minutes of transmitted content being the time period. As another example, the edge device 128 can determine that the natural language query comprises a predefined query that can be satisfied by a summary of the content over a default time period. For example, the edge device 128 can determine that the natural language query comprises the predefined query "What happened?" In this example, the natural language query does not specifically identify a time period of the content to summarize. The edge device 128 can determine a default time period, e.g. one minute, two minutes, five minutes, etc. The edge device 128 can determine the time period relative to a milestone, such as a last chapter break, a last scene break, or another milestone in the content.

Determining the one or more portions of the content to be transmitted to the user device as the summary of the content can include determining that the natural language query can be satisfied by a summary related to a particular character. For example, the edge device 128 can determine the particular character by comparing one or more keywords in the natural language query to a list of characters of the content. The list of characters can be included in metadata associated with the content. Thus, the presence, in the natural language query, of a keyword matching a character name can indicate that the query can be satisfied by a summary related to the particular character. As another example, the edge device 128 can determine that the natural language query comprises a predefined query that can be satisfied by a summary of the content related to the particular character. For example, the edge device 128 can determine that the natural language query comprises the predefined query "Who is that?" In this example, the natural language query does not identify the particular character. In such an example, the edge device 128 can identify the particular character associated with the query using metadata associated with the content. For example, the metadata can identify which characters are included in a particular scene, or are on screen over a predefined time period. As another example, the metadata can comprise a closed captioning or subtitle track. In such an example, the edge device 128 can identify the particular character as the speaker of one or more last spoken lines as indicated in the closed captioning or subtitle track.

Determining the one or more portions of the content to be transmitted to the user device as the summary of the content can include determining that the natural language query can be satisfied by a summary related to a particular event. The event can be indicated as one or more keywords in the natural language query. Accordingly, the particular event can be determined by identifying the one or more keywords. As another example, metadata associated with the content can indicate one or more keywords or identifiers associated with events in the content. Thus, the particular event can be identified by comparing one or more keywords in the natural language query to the list of one or more keywords in the metadata.

Given that the natural language query can be satisfied by a summary associated with a particular time period, character, event, or keywords, determining the one or more portions of the content can include identifying the one or more portions of the content based on the content metadata. As an example, the edge device 128 can determine a scope of the content from which portions of the content will be selected for inclusion of the summary. For example, if the natural language query is associated with a time period, the scope of the content will comprise a first portion of the content defined by the time period. As another example, if the natural language query is associated with a character, the scope of the content can be determined as those portions of the content indicated as being associated with the character according to content metadata.

For example, metadata for the content can include multiple metadata entries indicating a time range of the content. The metadata entries can also indicate one or more characters included in the content over the time range. For example, the metadata entries can include a character list. As another example, the metadata entries can include a summary or description of the content over the time range. Thus, the scope of the content can include those portions of the content, as defined by the time ranges in the metadata, having metadata entries comprising or indicating the particular character.

As a further example, if the natural language query is associated with an event or other keywords, the scope of the content can be determined as those portions of the content indicated as being associated with the keywords according to the content metadata. For example, the metadata entries include tags or identifiers of events associated with time ranges indicated in the metadata. As another example, the metadata entries can include a summary or description of the content over the time range. Thus, the scope of the content can include those portions of the content, as defined by the time ranges in the metadata, having metadata entries comprising or indicating the keywords.

The edge device 128 can then determine, from the scope of the content, one or more portions of content to include in the summary of content. As an example, the edge device 128 can access content metadata indicating the significance or relevance of particular portions of the content within the scope. The metadata can indicate a time period or time range for a given portion of content, and also indicate an associated rating expressing the significance of the given portion of content. The rating can be expressed numerically, e.g., two out of a maximum of five, six out of a maximum of ten. The rating can also be expressed as a tag or identifier specifically identifying the given portion of content as being relevant.

Determining the one or more portions of content to include in the summary of content can include selecting, from the scope of the content, those portions of the content having a significance or relevance rating satisfying a threshold. For example, given a scope comprising a first portion of content defined by a time period of ten minutes, the edge device 128 can select one or more second portions of the content from the first portion of the content having a significance rating meeting or exceeding "four" out of a possible "five." As another example, given a scope of the content comprising all portions of content from "Hamlet" indicated as being associated with the character "Claudius," the edge device 128 can select those portions of content being tagged as significant.

The determined one or more portions of content can then be transmitted to the user device. For example, the determined one or more portions of content can be transmitted as a sequence of the one or more portions of content. The edge device 128 can cause playback of the content to cease. Causing playback of the content to cease can comprise transmitting a "PAUSE" or "STOP" command to the user device. While playback is ceased, the content can continue to be transmitted to the user device for storage, e.g., in a buffer, for later playback. In another example, causing playback of the content to cease can comprise ceasing transmission of the content to the user device. The one or more portions of content can then be played by the user device. The edge device 128 can then cause playback of the content to resume.

Instead of transmitting the one or more portions of the content to the user device, the edge device 128 can transmit an audio summary associated with the one or more portions of content. For example, the audio summary can comprise a text-to-speech rendition of metadata associated with the determined one or more portions of content, such as a description or summary indicated in the metadata. As another example, the audio summary can comprise a text-to-speech rendition of closed captioning or subtitle tracks corresponding to the determined one or more portions of the content. The audio summary can be transmitted to the user device, or another computing device for playback, e.g., the computing device from which the natural language query was received.

The network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

FIG. 2 is example metadata 200 for content. The metadata 200 includes metadata entries 201 each corresponding to a respective portion of the content. The metadata entries 201 include a unique identifier 202. The metadata entries 201 also include timestamps such as a start time 203 and stop time 204 defining a time range for the respective portion of the content. The start time 203 and stop time 204 can facilitate identifying portions of the content occurring within a time period. For example, a natural language query of "What happened in the last ten minutes?" can result in identifying portions of content occurring partially or entirely within the last ten minutes of presented content.

The metadata entries 201 can also include a character list 208 indicating one or more characters appearing during the portion of the content. Also included is a description 210 providing a textual description of plot developments or other occurrences during the portion of content. The character list 208 and/or the description 210 can facilitate identifying portions of content using one or more keywords in a natural language query. For example, the character list 208 and/or description can be used to train a supervised keyword extraction algorithm applied to the natural language query. As another example, the character list 208 and/or description 210 can be correlated with terms and/or keywords in the natural language query to identify portions of content relevant to the natural language query.

The metadata entries 201 can also include a significance rating 206. In this example, the significance rating is represented numerically out of a maximum rating of five. In the alternative, the significance rating 206 can include a binary value or tag indicating whether or not a respective portion of the content is considered significant.

Figure 3:
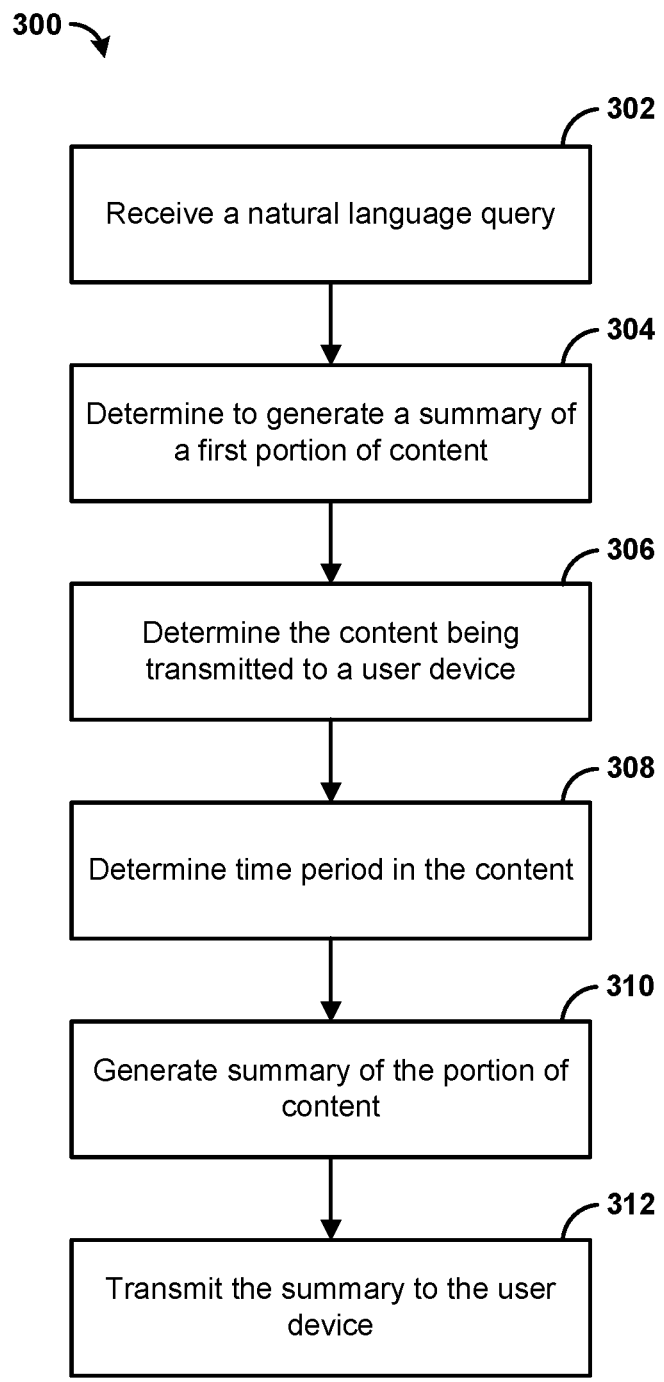
FIG. 3 is a flowchart of an example method.

FIG. 3 is a flowchart 300 of an example method. Beginning with step 302, a natural language query can be received, e.g., by an edge device 128. The natural language query can correspond to a user associated with a user device to which content is being transmitted. For example, the natural language query can comprise a voice query provided to a set top box or other user device to which content is being transmitted. As another example, the natural language query can comprise a voice query provided to a control device, e.g., a remote control, of the set top box. As a further example, the natural language query can comprise a voice query provided to a computing device configured to listen for ambient trigger keywords and commands in order to initiate reception of the voice query. In yet another example, the natural language query can comprise a text query transmitted by a user device, e.g., a mobile device.

In response to receiving the natural language query, at step 304, it can be determined, e.g., by the edge device 128, to generate a summary of content. Determining to generate the summary of content can comprise performing a contextual analysis on the natural language query to determine if the natural language query comprises a question. Determining if the natural language query comprises a question can include determining if the natural language query comprises a keyword such as "who," "what," "when," "where," "why," or "how." Determining if the natural language query comprises a question can also include determining if the natural language query matches one or more predefined queries, e.g., "What happened in the last X minutes?," where X is a number of minutes, or "What happened?" Thus, natural language queries to perform playback functions or trick plays, e.g., rewind, pause, or fast-forward, can be differentiated from natural language queries which should be responded to with a summary of content.

At step 306 it can be determined what content is being transmitted to the user device, e.g., by the edge device 128. Determining what content is being transmitted to the user device can include accessing request logs, transmissions, queues, or other data associated with the user device that can identify the content. Determining what content is being transmitted to the user device can also include transmitting a request to the user device to identify the content.

A time period associated with the content can be determined, e.g., by the edge device 128, at step 308. Determining the time period can comprise determining a time at which the natural language query was received. Determining the time period can comprise determining that the natural language query indicates the time period, e.g. "What happened in the last ten minutes," with the ten minutes prior to the time at which the natural language query was received being the time period. The time period can also be determined as a default value. Determining the time period as a default value can include that the natural language query comprises a predefined query associated with the default time period. For example, it can be determined that the natural language query comprises the predefined query "What happened?" In this example, the natural language query does not specifically identify a time period. Accordingly, a default time period relative to the time at which the natural language was received, e.g. one minute prior, two minutes prior, five minutes prior, can be determined. The default time period can correspond to one or more keywords in the natural language query. For example, the natural language query "What just happened?" includes the keyword "just." In such an example, the default time period can correspond to a shorter time period, e.g., thirty seconds, one minute. Conversely, the natural language query "What happened?" or "What's been happening?" can correspond to a longer default time period, e.g., two minutes, five minutes, or ten minutes, as the natural language query lacks the keyword "just." Where the natural language query does not indicate the time period, the time period can be determined relative to a milestone in the content, such as a last chapter break, a last scene break, or another milestone in the content. In such an example, the milestone can serve as a start point of the time period, and the time at which the natural language query was received can serve as an end point of the time period.

At step 310, a summary of the content can be generated, e.g., by the edge device 128. Generating a summary of the content can include generating a summary of a first portion of the content defined by the time period determined in step 308. For example, if the time period was determined as the last ten minutes prior to receiving the natural language query, the summary of the content can comprise a summary of a first portion of the content defined by the last ten minutes of the content. Generating the summary of the first portion of the content defined by the time period can comprise determining one or more second portions of the content included in the first portion of the content defined by the time period, e.g., one or more "clips" taken from the first portion of the content and occurring within the time period. Determining one or more second portions of the content included in the first portion of the content defined by the time period can be performed based on metadata associated with the content. For example, the metadata can include a plurality of metadata entries each corresponding to a time range in the content. As an example, each metadata entry can include timestamps such as a start time and a stop time, indicating to which portion of the content the data indicated in the metadata entry pertains. Each metadata entry can also include a tag or identifier indicating the significance or relevance of the corresponding portion of the content. For example, the tag or identifier can express the significance or relevance of the corresponding portion of the content numerically, e.g., two out of a maximum of five, six out of a maximum of ten. The tag or identifier can express the significance or relevance of the corresponding portion of the content as a binary option, e.g., either relevant or not relevant.

Accordingly, determining one or more second portions of the content included in the first portion of the content defined by the time period can include determining the one or more second portions identified as being significant or relevant and as being included in the time period as indicated by the time ranges of the metadata entries. For example, the one or more second portions of the content can be determined as having a significance rating satisfying a threshold, e.g., having a significance rating meeting or exceeding "four" out of a possible "five." As another example, the one or more second portions of the content can be determined as having a tag or identifier indicating the respective second portion as significant.

The one or more second portions of the content can be determined according to a maximum total duration of the one or more second portions of the content. The maximum total duration can be determined as a function of the time period of the first portion of the content. For example, a maximum total duration can be determined as no more than twenty percent of the time duration. A natural language query of "What happened in the last ten minutes?" would result in a time period for the first portion of the content of ten minutes. Accordingly, the maximum total duration of the one or more second portions of the content, e.g., the summary, would equal two minutes. As another example, the maximum total duration can be a predefined maximum duration, e.g., one minute, two minutes, five minutes.

The summary can then be transmitted, e.g., to the user device by the edge device 128, at step 312. For example, playback of the content by the user device can be caused to pause or stop. Causing playback of the content to pause or stop can comprise transmitting a "PAUSE" or "STOP" command to the user device. While playback is paused, the content can continue to be transmitted to the user device for storage, e.g., in a buffer, for later playback. In another example, causing playback of the content to cease can comprise ceasing transmission of the content to the user device. The summary of the content can then be played by the user device instead of the content itself. Playback of the content by the user device can then be caused to resume.

Figure 4:
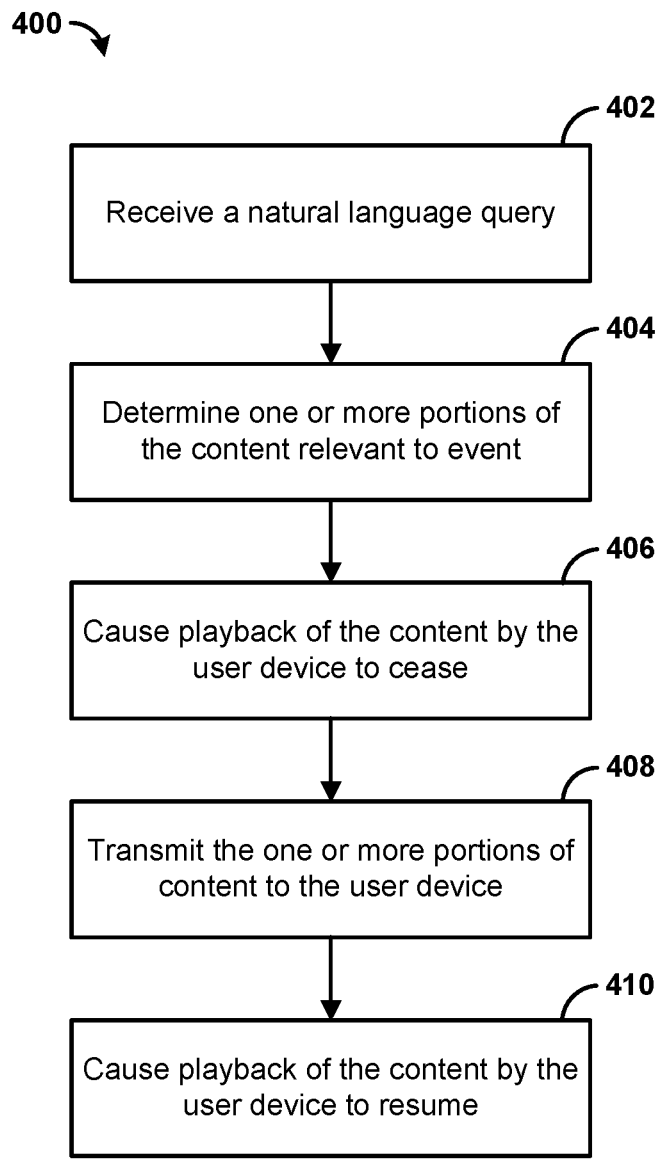
FIG. 4 is a flowchart of an example method.

FIG. 4 is a flowchart 400 of an example method. Beginning with step 402, a natural language query can be received, e.g., by an edge device 128. The natural language query can be associated with a transmission of content to a user device. For example, the natural language query can comprise a voice query provided to a set top box or other user device to which content is being transmitted. As another example, the natural language query can comprise a voice query provided to a control device, e.g., a remote control, of the set top box. As a further example, the natural language query can comprise a voice query provided to a computing device configured to listen for ambient trigger keywords and commands in order to initiate reception of the voice query. In yet another example, the natural language query can comprise a text query transmitted by a user device, e.g., a mobile device.

In response to receiving the natural language query, one or more portions of the content relevant to an event can be determined, e.g., by the edge device 128. Determining the one or more portions of the content relevant to the event can include identifying one or more keywords in the natural language query associated with the event. For example, metadata associated with the content can include one or more metadata entries describing respective portions of the content. The one or more metadata entries can include timestamps such as a start time and/or a start time defining a time range for the respective portion of the content. The metadata entries can also include metadata indicating events that occur during the time range of the respective portion of content.

For example, the metadata entries can include tags or descriptors indicating particular events occurring during the respective portion of content, e.g., "Polonius dies," "Hamlet dies," "Ophelia dies," "Hamlet soliloquy." As another example, the metadata entries can include a text description or summary of what occurs during the respective portion of the content, e.g., "Claudius arranges Hamlet's immediate transportation to England and sends a letter to the English king demanding that he arranges Hamlet's immediate death." Accordingly, identifying one or more keywords in the natural language query associated with the event can include identifying a correlation between one or more keywords in the natural language query and an occurrence of the one or more keywords, or related words, in the metadata. Thus, the one or more portions of the content associated with the event can be determined as those portions of the content having metadata entries correlated with one or more keywords in the natural language query.

Determining the one or more portions of the content can also include determining those portions of the content associated with the event and identified as being relevant or significant according to the content metadata. For example, the metadata entries can each include a tag or identifier indicating the significance or relevance of the corresponding portion of the content. For example, the tag or identifier can express the significance or relevance of the corresponding portion of the content numerically, e.g., two out of a maximum of five, six out of a maximum of ten. The tag or identifier can express the significance or relevance of the corresponding portion of the content as a binary option, e.g., either relevant or not relevant.

Accordingly, determining one or more portions of the content can include determining the one or more portions of the content associated with the event, as discussed above, and identified as being significant or relevant. For example, the one or more portions of the content can be determined as having a significance rating satisfying a threshold, e.g., having a significance rating meeting or exceeding "four" out of a possible "five." As another example, the one or more portions of the content can be determined as having a tag or identifier indicating the respective second portion as significant.

In step 406, playback of the content by the user device can be caused to cease, e.g., by the edge device 128. Causing playback of the content to cease can comprise transmitting a "PAUSE" or "STOP" command to the user device. While playback has ceased, the content can continue to be transmitted to the user device for storage, e.g., in a buffer, for later playback. In another example, causing playback of the content to cease can comprise ceasing transmission of the content to the user device. In step 408 the determined one or more portions of the content are transmitted to the user device, e.g., by the edge device 128. In step 410, playback of the content by the user device is caused to resume. Causing playback of the content by the user device can comprise transmitting a "PLAY" command to the user device. Causing playback of the content by the user device can also comprise resuming transmission of the content to the user device.

Figure 5:
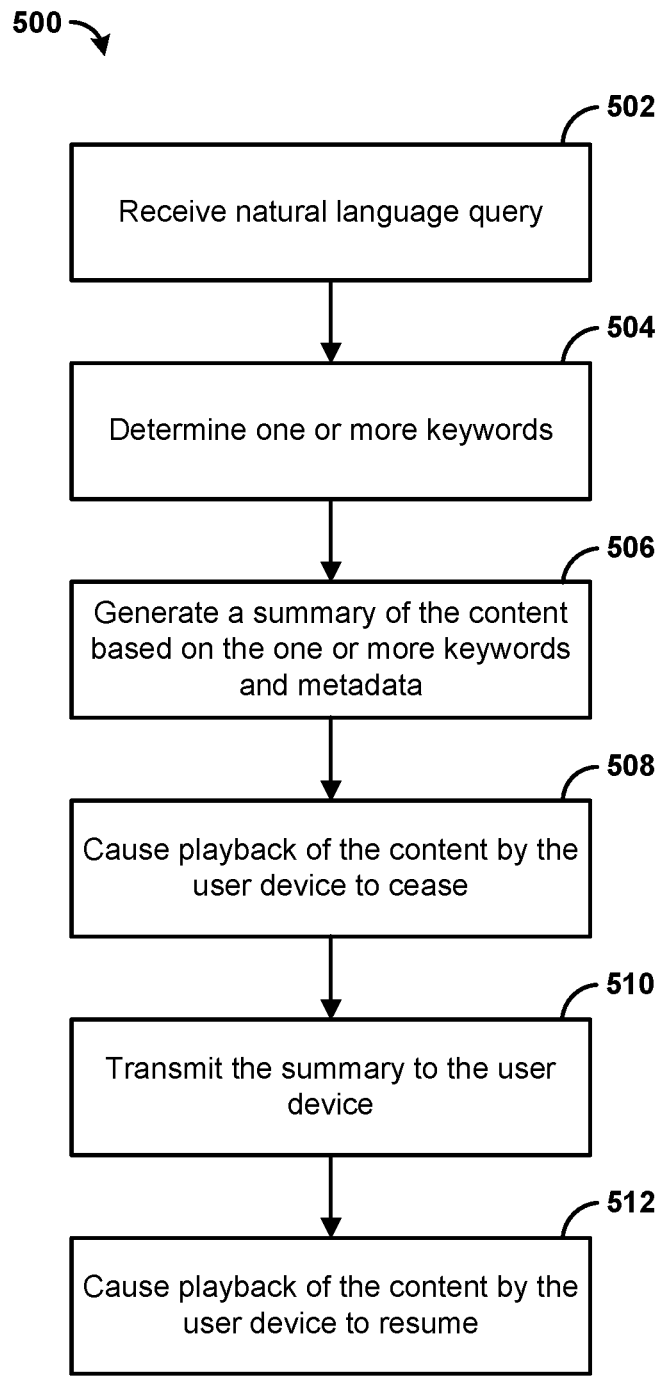
FIG. 5 is a flowchart of an example method.

FIG. 5 is a flowchart 500 of an example method. Beginning with step 502, a natural language query can be received, e.g., by an edge device 128. The natural language query can be associated with a transmission of content to a user device. For example, the natural language query can comprise a voice query provided to a set top box or other user device to which content is being transmitted. As another example, the natural language query can comprise a voice query provided to a control device, e.g., a remote control, of the set top box. As a further example, the natural language query can comprise a voice query provided to a computing device configured to listen for ambient trigger keywords in order to initiate reception of the voice query. In yet another example, the natural language query can comprise a text query transmitted by a user device, e.g., a mobile device.

In response to receiving the natural language query, at step 504, one or more keywords can be determined from the natural language query, e.g., by the edge device 128. For example, a supervised or unsupervised keyword extraction algorithm can be applied to the natural language query. A supervised keyword extraction algorithm can be trained using metadata associated with the content. For example, metadata associated with the content can include one or more metadata entries describing respective portions of the content. The one or more metadata entries can include timestamps such as a start time and/or a start time defining a time range for the respective portion of the content. The metadata entries can also include metadata indicating events that occur during the time range of the respective portion of content.

For example, the metadata entries can include tags or descriptors indicating particular events occurring during the respective portion of content, e.g., "Polonius dies," "Hamlet dies," "Ophelia dies," "Hamlet soliloquy." As another example, the metadata entries can include a text description or summary of what occurs during the respective portion of the content, e.g., "Claudius arranges Hamlet's immediate transportation to England and sends a letter to the English king demanding that he arranges Hamlet's immediate death." As a further example, the metadata can indicate one or more characters appearing in the respective portion of the content. Such metadata entries can be used to train a supervised keyword extraction algorithm. As another example, determining one or more keywords in the natural language query can include identifying those keywords in the natural language query matching or having a degree of similarity above a threshold with respect to one or more of the metadata entries.

A summary of the content based on the determined one or more keywords and the metadata can be generated at step 506. For example, generating the summary can include determining one or more portions of content having corresponding metadata entries matching the one or more keywords. As another example, generating the summary can include determining one or more portions of content having metadata entries matching the one or more keywords and identified as significant or relevant according to the content metadata. For example, the metadata entries can each include a tag or identifier indicating the significance or relevance of the corresponding portion of the content. For example, the tag or identifier can express the significance or relevance of the corresponding portion of the content numerically, e.g., two out of a maximum of five, six out of a maximum of ten. The tag or identifier can express the significance or relevance of the corresponding portion of the content as a binary option, e.g., either relevant or not relevant.

For example, a given portion of content can be considered significant in response to having a significance rating satisfying a threshold, e.g., having a significance rating meeting or exceeding "four" out of a possible "five." As another example, a given portion of content can be considered significant in response to having a tag or identifier indicating the respective second portion as significant.

In step 508, playback of the content by the user device can be caused to cease, e.g., by the edge device 128. Causing playback of the content to cease can comprise transmitting a "PAUSE" or "STOP" command to the user device. While playback has ceased, the content can continue to be transmitted to the user device for storage, e.g., in a buffer, for later playback. In another example, causing playback of the content to cease can comprise ceasing transmission of the content to the user device. In step 540 the determined one or more portions of the content are transmitted to the user device, e.g., by the edge device 128. In step 512, playback of the content by the user device is caused to resume. Causing playback of the content by the user device can comprise transmitting a "PLAY" command to the user device. Causing playback of the content by the user device can also comprise resuming transmission of the content to the user device.

Figure 6:
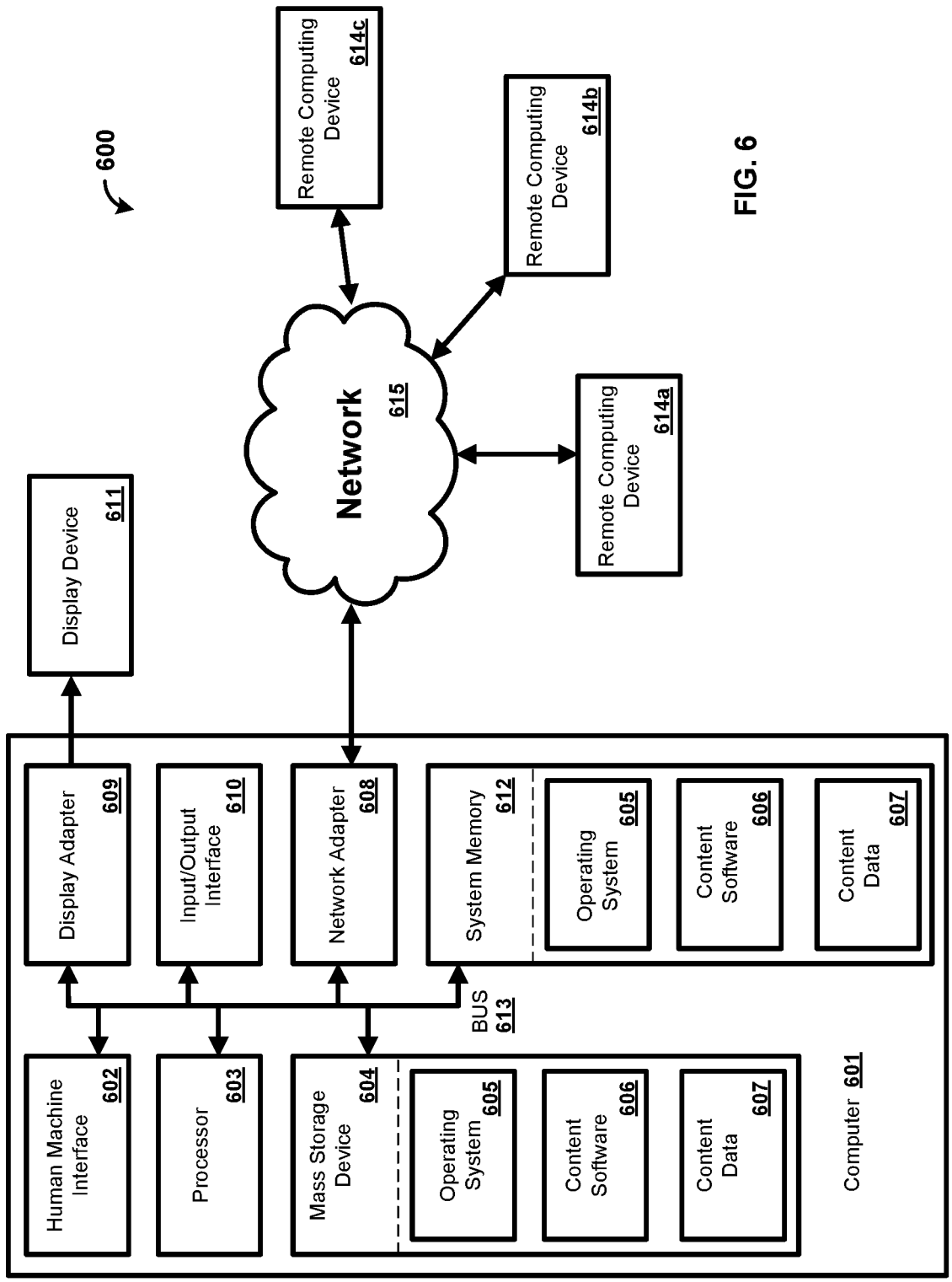
FIG. 6 is a block diagram of an example computing device.

The methods and systems can be implemented on a computer 601 as illustrated in FIG. 6 and described below. By way of example, the edge device 128 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, content software 606, content data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content data 607 and/or program modules such as the operating system 605 and the content software 606 that are immediately accessible to and/or are presently operated on by the one or more processors 603.

The computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the content software 606. Each of the operating system 605 and the content software 606 (or some combination thereof) can comprise elements of the programming and the content software 606. The content data 607 can also be stored on the mass storage device 604. The content data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

The display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the content software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving a natural language query associated with output of content by a computing device;
   determining, based on the natural language query, a portion of the content responsive to the natural language query;
   determining, based on metadata satisfying a threshold, a summary of the portion of the content, wherein the metadata is associated with the portion of the content; and
   sending, to the computing device, the summary of the portion of the content.

2. The method of claim 1, further comprising selecting, based on the metadata associated with the content, the summary of the portion of the content from a plurality of summaries.

3. The method of claim 1, wherein the metadata associated with the content comprises an indicator of a significance of the summary, wherein the indicator of the significance of the summary satisfies the threshold.

4. The method of claim 1, wherein the metadata associated with the content comprises an indicator of a relevance of the summary to the content based on the natural language query, wherein the indicator of the relevance of the summary satisfies the threshold.

5. The method of claim 1, wherein receiving the natural language query comprises receiving the natural language query while the content is being output by the computing device.

6. The method of claim 1, further comprising determining, based on the natural language query being indicative of a character or an event, a start time of the portion of the content.

7. The method of claim 6, wherein sending the summary of the portion of the content comprises:
   causing playback of the content on the computing device to stop;
   sending, to the computing device, the summary of the portion of the content; and
   causing the playback of the content on the computing device to resume.

8. The method of claim 1, wherein the summary is based on a time code associated with the natural language query.

9. The method of claim 1, further comprising determining, based on the natural language query, a duration for the summary of the portion of the content.

10. The method of claim 1, wherein the natural language query is based on audio data.

11. A method comprising:
    receiving a natural language query associated with output of content by a computing device;
    determining, based on the natural language query and the content, a summary of at least a portion of the content; and
    sending, to the computing device and based on metadata, associated with the content, indicating that the summary is significant, the summary.

12. The method of claim 11, further comprising selecting, based on the metadata associated with the content, the summary from a plurality of summaries.

13. The method of claim 11, wherein the metadata associated with the content is indicative of a significance of the summary and wherein the significance of the summary satisfies a threshold indicating that the summary is significant.

14. The method of claim 11, wherein the natural language query is associated with the content being output by the computing device.

15. The method of claim 11, further comprising determining, based on the natural language query being indicative of a character or an event, a start time of a first portion of the content.

16. An apparatus comprising:
one or more processors; and
a memory storing processor-executable instructions that, when executed by the one or more processors, cause the apparatus to:
receive a natural language query associated with output of content by a computing device;
determine, based on the natural language query, a portion of the content responsive to the natural language query;
determine, based on metadata, associated the portion of the content, satisfying a threshold, a summary of the portion of the content; and
send, to the computing device, the summary of the portion of the content.

17. The apparatus of claim 16, wherein the processor-executable instructions, when executed by the one or more processors, further cause the apparatus to select, based on the metadata associated with the content, the summary from a plurality of summaries.

18. The apparatus of claim 16, wherein the metadata associated with the content comprises an indicator of a significance of the summary, wherein the indicator of the significance of the summary satisfies the threshold.

19. The apparatus of claim 16, wherein the metadata associated with the content comprises an indicator of a relevance of the summary to the content based on the natural language query, wherein the indicator of the relevance of the summary satisfies the threshold.

20. The apparatus of claim 16, wherein the processor-executable instructions that, when executed by the one or more processors, cause the apparatus to receive the natural language query, cause the apparatus to receive the natural language query while the content is being output by the computing device.

21. The apparatus of claim 16, wherein the processor-executable instructions, when executed by the one or more processors, further cause the apparatus to determine, based on the natural language query being indicative of a character or an event, a start time of the portion of the content.

22. The apparatus of claim 21, wherein the processor-executable instructions that, when executed by the one or more processors, cause the apparatus to send the summary of the portion of the content, cause the apparatus to:
cause playback of the content on the computing device to stop;
send, to the computing device, the summary of the portion of the content; and
cause the playback of the content on the computing device to resume.

23. The apparatus of claim 16, wherein the summary is based on a time code associated with the natural language query.

24. The apparatus of claim 16, wherein the processor-executable instructions, when executed by the one or more processors, further cause the apparatus to determine, based on the natural language query, a duration for the summary of the portion of the content.

25. The apparatus of claim 16, wherein the natural language query is based on a voice query.

* * * * *